United States Patent [19]

Frassek et al.

[11] 4,340,515

[45] Jul. 20, 1982

[54] SOLID RUBBER ADHESION PROMOTER AND A METHOD FOR IMPROVING THE ADHESION OF RUBBER TO METAL REINFORCING ELEMENTS EMBEDDED THEREIN

[75] Inventors: Karl-Heinz Frassek, Langerwehe, Fed. Rep. of Germany; Willy J. van Ooij, Dieren, Netherlands

[73] Assignee: Akzo NV, Arnhem, Netherlands

[21] Appl. No.: 274,251

[22] Filed: Jun. 16, 1981

[51] Int. Cl.$^3$ ............................ C08L 7/00; C08L 9/00; C08F 1/04; C08C 4/00

[52] U.S. Cl. ............................ 524/274; 156/124; 260/105; 260/755; 524/396

[58] Field of Search ................ 260/755, 27 BB, 105; 156/124

[56] References Cited

U.S. PATENT DOCUMENTS

| | | | |
|---|---|---|---|
| 2,025,870 | 12/1935 | Krumbhaar | 260/105 |
| 2,236,296 | 3/1941 | Minich et al. | 260/105 |
| 2,294,287 | 8/1942 | Elliott | 260/105 |
| 2,431,191 | 11/1947 | Mosher | 260/105 |
| 2,466,925 | 4/1949 | Brauner | 260/105 |
| 2,528,429 | 10/1950 | Elliott et al. | 260/105 |
| 2,572,071 | 10/1951 | St. Clair et al. | 260/105 |
| 3,997,487 | 12/1976 | Rees et al. | 260/27 BB |
| 4,203,874 | 5/1980 | Halasa et al. | 260/3 |
| 4,214,058 | 7/1980 | Imamura et al. | 260/775 |
| 4,258,770 | 3/1981 | Davis et al. | 156/124 |

*Primary Examiner*—H. S. Cockeram
*Attorney, Agent, or Firm*—Stevens, Davis, Miller & Mosher

[57] ABSTRACT

The present invention relates to a solid rubber adhesion promoter composition. It comprises 20–90%, preferably 60–80% by weight of cobalt naphthenate, nickel naphthenate or a mixture thereof and 10–80%, preferably 20–40% by weight of cobalt resinate, nickel resinate or a mixture thereof.

The composition can be produced in the form of crisp, non-dusting, friable cast solids, powders or flakes. It has a long shelf life and mixes very well into rubber compounds.

By the use of the present promoter compositions strong rubber-to-metal adhesion is obtained.

9 Claims, No Drawings

SOLID RUBBER ADHESION PROMOTER AND A METHOD FOR IMPROVING THE ADHESION OF RUBBER TO METAL REINFORCING ELEMENTS EMBEDDED THEREIN

BACKGROUND OF THE INVENTION AND PRIOR ART

It is well known in the art to reinforce rubber with metal elements. These reinforced rubber compositions are applied in the preparation of various articles such as hose, belts, tires and rubber vibration insulators. In particular, the incorporation of metal wire cords into pneumatic tires of the radial ply type has found wide application. It is, of course, of the utmost importance that the bond between the rubber and the metal should be as strong as possible and remain intact over a long period of time, even under severe conditions. One of the problems which has been recognized is that corrosion of the metal surface may occur under the influence of moisture. This, of course, adversely affects the rubber-to-metal bond strength. To achieve satisfactory rubber-to-metal bonding various adhesion promoters have been suggested and developed.

For instance, German Patent Application No. p 33.232 suggests the use of zinc salts of unsaturated or saturated fatty acids, resin acids, naphthenic acid, oxidized paraffinic acids or mixtures thereof. Canadian Patent Specification 895371 describes rubber compositions comprising a tackifying amount of a Group I or II metal resinate. German Patent Specification 898 809 teaches the use of cobalt naphthenate as rubber adhesion promoter.

According to U.S. Pat. No. 4,203,874 use may be made of a cobalt rubber adhesion promoter having the formula:

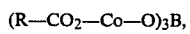

wherein R is an alkyl radical of from 9 to 12 carbon atoms. This promoter is commercially available under the tradename Manobond C (Wyrough and Loser Inc., Trenton, N.J.).

DESCRIPTION OF THE INVENTION

The present invention relates to a solid rubber adhesion promoter composition comprising 20–90% by weight of cobalt naphthenate, nickel naphthenate, or a mixture thereof, and 10–80% by weight of cobalt resinate, nickel resinate or a mixture thereof. Preferably, the composition comprises a mixture of cobalt naphthenate and cobalt resinate or a mixture of nickel naphthenate and nickel resinate.

The present composition has excellent handling properties. It can be produced in the form of crips, non-dusting, friable cast solids, powders or flakes. It has a long shelf life, i.e. longer than 6 months and can very well be mixed into rubber compounds.

With respect to the properties of the resulting reinforced rubber composition excellent rubber-to-metal adhesion and very good tackiness were observed. Due to the incorporation of the present promoter system no significant retardation or acceleration of the cure rates were noticed.

Preferably, the composition according to the invention comprises 60–80% by weight of cobalt naphthenate and 20–40% by weight of cobalt resinate or 60–80% by weight of nickel naphthenate or 20–40% by weight of nickel resinate. Within these ranges the handling properties are optimal.

The present composition may be prepared by reacting naphthenic acid and resin acid with cobalt acetate and/or nickel acetate or with cobalt hydrate and/or nickel hydrate in the presence of acetic acid. In general, the reaction temperature is in the range of 140° to 180° C. If the reaction is carried out in this way, also relatively small amounts of cobalt acetate and/or nickel acetate are formed. However, it has been found that the presence of up to 10% by weight of said acetate does not adversely affect the properties of the present promoter or those of the resulting reinforced rubber composition.

In general, rubber formulations to be used in tires and into which the metal elements are to be incorporated (tire cord skim stocks) comprises:
- 100 parts of rubber;
- 30–65 parts of carbon black;
- 1.0–10 parts of aromatic process oils;
- 1–12 parts of zinc ozide;
- 1.0–10 parts of sulfur;
- 0.2–10 parts of adhesion promoter;
- 0.1–5 parts of stearic acid;
- 0.1–3 parts of antioxidant;
- 0.1–2 parts of accelerator.

DETAILED DESCRIPTION OF THE INVENTION

In the following Examples it is demonstrated how the present promoter composition may be prepared. Furthermore, a comparison is made between the handling properties of the present product and those of the products not obtained according to the present invention. Finally, it is demonstrated that the promoter compositions of the invention are excellent adhesion promoters.

The resinate used is a cobalt and/or nickel salt of Poly-Pale ® II resin. This resin is a pale, thermoplastic, non-crystallizing acidic resin made by partial polymerization of tall oil rosin (pine tree resin). One of the main constituents of tall oil rosin is abietic acid. Poly-Pale ® II resin is commercially available and supplied by Hercules Inc.

It exhibts a higher softening point, higher viscosity, and greater resistance to oxidation than unmodified wood, gum, or tall oil rosins.

The rubber to be used in the present invention must be sulfur-vulcanizable. Examples are natural rubbers, synthetic rubbers, polybutadiene, copolymers of butadiene and styrene, polyisoprene and the like and mixtures thereof. Examples of various components which may be used in the rubber formulations to be reinforced are given in U.S. Pat. No. 4,203,874, which is herein incorporated by reference.

EXAMPLE I

A solid rubber adhesion promoter composition according to the invention and consisting of:
- 70% by weight of cobalt naphthenate;
- 23% by weight of cobalt resinate; and
- 7% by weight of cobalt acetate was prepared in the following manner.

(a) Into a stainless steel vented reactor fitted with a high speed agitator were charged 3.13 kg of distilled naphthenic acid and heated to a temperature of 100°–110° C.

(b) 1.04 kg of Poly-Pale ® II resin was added.

(c) When the resin had dissolved, the mixture was cooled to 90° C., after which 0.84 kg of cobalt hydrate (63% Co) was added; the mixture was thoroughly agitated.

(d) 0.23 kg of acetic acid was added cautiously, whereafter the reaction mixture was allowed to thin out for a moment.

(e) The temperature was raised gradually to 160° C., allowing the water-of-reaction to be vented off.

(f) The temperature was maintained at 160° C. until no more reaction water was found to evolve and no longer any foaming occurred.

(g) The mixture was discharged cautiously into a shallow vessel for solidification and subsequently pulverized.

The cobalt content of the composition was 10.4% by weight. The corresponding nickel composition was prepared in a similar manner. It contained 9.7% by weight of nickel.

EXAMPLE II

The two compositions prepared in Example I were tested for their handling properties. (friability and sheft life). Both were determined visually. To determine the shelf life, the compositions were placed in a closed glass vessel at 20° C. Discoloration, caking together and the release of a bad smell were clearly indicative of the decomposition of the promoter having started.

To determine the miscibility of the present compositions in rubber, a masterbatch consisting of 100 parts of natural rubber, 55 parts of LS HAF black, 10 parts of zinc oxide, 2 parts of stearic acid, 2 parts of (N-(1,3-dimethylbutyl)N'-phenyl-p-phenylene diamine (antioxidant) and 5 parts of aromatic process oils was mixed on a roll mill with 4 parts of sulfur, 0.8 parts of morfolinothio benzothiazole sulfenamide (accelerator) and 1.0 part of adhesion promoter. The mixing temperature was 70° C.

During milling the miscibility of the promoter with the rubber masterbatch was observed. As far as the tackiness of the resulting rubber formulation was concerned, the degree to which the formulation adhered to the mill rolls was assessed. The tackiness was considered satisfactory if the formulation did not adhere or adhered only slightly to the mill rolls.

The experiments were repeated with several promoters not belonging to the present invention. The results are summarized in Table I.

TABLE I

| adhesion promotor | friability | shelf life | miscibility-into the rubber compound | tackiness rubber composition |
| --- | --- | --- | --- | --- |
| Co naphthenate/ Co resinate | ++ | >6 months | ++ | ++ |
| Co naphthenate (11.1% Co) | − − | <1 month | − | − − |
| Co resinate (8.4% Co) | + | >6 months | + | + |
| Ni naphthenate/ Ni resinate | ++ | >6 months | ++ | ++ |
| Ni naphthenate (10.7% Ni) | − − | <1 month | − | − |
| Ni resinate (8.1% Ni) | + | >6 months | + | + |
| Manobond C | liquid | >6 months | −* | − −* |

TABLE I-continued

| adhesion promotor | friability | shelf life | miscibility-into the rubber compound | tackiness rubber composition |
| --- | --- | --- | --- | --- |
| (16% Co) | | | | |

− −: very poor
−: poor
+: good
++: very good
*instead of 1 part of Manobond C, 0.7 parts was added.

These results clearly demonstrate the very good handling and performance properties of the present compositions.

EXAMPLE III

The rubber compositions obtained in Example II were reinforced with brass-plated steel tire cords of 4×0.25 mm construction with 68.4% Cu and 4.5 g/kg brass plating weight. They were embedded over a length of 10 mm. The pads were cured for 20 minutes at 150° C.

The steel cord pull out force was determined in accordance with ASTM D2229-73 specifications at a pulling rate of 15 cm/min. The data presented below are the average values of 24 pull-outs.

The adhesion was determined directly after preparation as well as after a steam aging test. For the latter purpose cured pads were aged in saturated steam for 8 hours at 120° C. This test was carried out to establish the influence of moisture on the metal-to-rubber bond. As in Example II, the same experiments were carried out with promoters not belonging to the present invention. To be able to assess the influence of the ageing test, a control run without the addition of a adhesion promoter was carried out.

The results are summarized in Table II.

TABLE II

| | initial adhesion | | steam aged adhesion | |
| --- | --- | --- | --- | --- |
| adhesion promoter | pull-out force (N/10 mm) | rubber coverage (%) | pull-out force (N/10 mm) | rubber coverage (%) |
| none | 330 | 60 | 315 | 30 |
| Co-naphthenate/ Co-resinate | 360 | 80 | 330 | 40 |
| Co-naphthenate | 390 | 80 | 290 | 30 |
| Co-resinate | 360 | 70 | 300 | 40 |
| Ni-naphthenate/ Ni-resinate | 355 | 80 | 300 | 30 |
| Ni-naphthenate | 370 | 80 | 295 | 20 |
| Ni-resinate | 350 | 80 | 330 | 40 |
| Manobond C | 380 | 90 | 290 | 40 |

These results demonstrate that by the use of the present promoter compositions strong rubber-to-metal adhesion is obtained even after prolonged steam aging.

We claim:

1. A solid rubber adhesion promoter composition comprising 20-90% by weight of cobalt naphthenate, nickel naphthenate or a mixture thereof and 10-80% by weight of cobalt resinate, nickel resinate or a mixture thereof.

2. A solid rubber adhesion promoter composition comprising 20-90% by weight of cobalt naphthenate and 10-80% by weight of cobalt resinate.

3. A solid rubber adhesion promoter composition comprising 60-80% by weight of cobalt naphthenate and 20-40% by weight of cobalt resinate.

4. A solid rubber adhesion promoter composition consisting essentially of 20-90% by weight of cobalt naphthenate, 10-80% by weight of cobalt resinate and 0-10% by weight of cobalt acetate.

5. A solid rubber adhesion promoter composition consisting essentially of 60-80% by weight of cobalt naphthenate, 20-40% by weight of cobalt resinate and 0-10% by weight of cobalt acetate.

6. A solid rubber adhesion promoter composition comprising 20-90% by weight of nickel naphthenate and 10-80% by weight of nickel resinate.

7. A solid rubber adhesion promoter composition consisting essentially of 20-90% by weight of nickel naphthenate, 10-80% by weight of nickel resinate and 0-10% by weight of nickel acetate.

8. A solid rubber adhesion promoter composition consisting essentially of 60-80% by weight of nickel naphthenate, 20-40% by weight of nickel resinate and 0-10% by weight of nickel acetate.

9. A method for improving the adhesion of rubber to metal reinforcing elements embedded therein by incorporating into 100 parts of rubber prior to curing 0.2-10 parts of the solid promoter composition of claim 1.

* * * * *